C. A. JUENGST.
BOOK OR PAMPHLET COVERING MACHINE.
APPLICATION FILED MAR. 19, 1910. RENEWED NOV. 17, 1919.

1,346,799.

Patented July 13, 1920.
11 SHEETS—SHEET 10.

C. A. JUENGST.
BOOK OR PAMPHLET COVERING MACHINE.
APPLICATION FILED MAR. 19, 1910. RENEWED NOV. 17, 1919.

1,346,799.

Patented July 13, 1920.

UNITED STATES PATENT OFFICE.

CHARLES A. JUENGST, OF CROTON FALLS, NEW YORK, ASSIGNOR TO HIMSELF AND GEORGE JUENGST, JR., OF CROTON FALLS, NEW YORK, DOING BUSINESS UNDER THE NAME OF GEORGE JUENGST & SONS.

BOOK OR PAMPHLET COVERING MACHINE.

1,346,799.      Specification of Letters Patent.      Patented July 13, 1920.

Application filed March 19, 1910. Serial No. 550,305. Renewed November 17, 1919. Serial No. 338,527.

*To all whom it may concern:*

Be it known that I, CHARLES A. JUENGST, a citizen of the United States, and a resident of Croton Falls, in the county of Westchester and State of New York, have invented certain new and useful Improvements in Book or Pamphlet Covering Machines, of which the following is a specification.

The present invention relates to book or pamphlet covering machines, and has for its main object a general reorganization of prior structures whereby books may be more expeditiously handled.

Machines of this character comprise essentially a "book conveyer" and "cover applying means." The "book conveyer" may be of any suitable construction and in the form here disclosed consists of an endless conveyer having suitable book clamps. The "cover applying means" may assume many forms and may consist of many instrumentalities, such as means for roughening the backs of the books, means for applying adhesive, either to the cover or to the books, means for applying strips of cotton to reinforce the back of the books, cover feeding means, cover pressing means, and cover breaking means.

All of these instrumentalities are however not necessary to apply the cover to the book, thus, in the form of the invention here disclosed the means for roughening the backs of the books and for applying strips of cotton thereto are omitted.

In the prior art it has been customary to employ a book conveyer having an intermittent motion, and to apply the cover while the book is standing still. One of the features of the present invention is to provide means for applying the cover while the book is traveling, to the end that a continuously advancing book conveyer may be employed. In this manner the book is handled quicker, and I am enabled to more readily connect the book covering machine up with a continuous running signature gathering or other machine, such as a stitcher.

In carrying out this invention there is employed a cover breaker which travels longitudinally in unison with the book conveyer while it is acting upon the book.

The cover breaker and book conveyer, as here shown, have a motion one with relation to the other in addition to the longitudinal motion referred to, and in addition to the transverse motion of the cover breaking members. Either the conveyer may be moved toward the cover breaker, or both may be moved, or, as disclosed in the present form, the cover breaker may rise and fall with reference to the conveyer.

When the book comes opposite to the cover breaker, the cover will preferably already have been applied to the book. If desired, however, the cover may be fed in over the cover breaker and below the plane of the back of the book, in which case the cover breaker by its rising movement will lift the cover and press it into engagement with the back of the book. In that case the construction would embody a combined cover breaker and cover presser.

It is preferred, however, that the cover be pressed into contact with the back of the book prior to the time it is acted upon by the cover breaker.

The cover may be fed to the books in any suitable manner, but, in the present form, an endless conveyer having pusher fingers is utilized.

Preferably the books to be covered are fed automatically to the book conveyer. In this manner, the operation of making the books can be made automatic and continuous throughout without any intervention on the part of the operator. In the form of the invention disclosed, the books may be brought automatically from a signature gathering or other machine, such as a stitcher or sewing machine. In order to carry out this object of the invention, means are provided for feeding the books to the book conveyer in a horizontal direction and upright position. These feeding means feed the books in the same direction as the advancing movement of the book conveyer, and at an angle to the opening and closing movement of the book clamps carried by the conveyer.

A further object of the invention is to prevent the application of glue to the book in case no cover is fed into the machine at the appropriate time to meet a certain book. This feature of the invention consists in means controlled by the cover feeding mechanism for preventing the application of glue to the book. These means may take many forms, but in the present instance the book or the glue roller is given a movement one or both with relation to the other. As here shown, the glue roller has a movement toward and away from the path of the book, which movement is interrupted by the absence of a blank or cover in the cover feeding means. In the specific form here shown, the cover drum or cylinder is conveniently utilized to effect this interruption by arranging a feeler over a groove in the cylinder. This feeler controls the connection between the glue roller and the actuating means for raising and lowering the same.

The book conveyer, in itself, embodies novel features of construction. A plurality of book clamps are arranged to form an endless conveyer, being hinged together. Upper and lower sprocket wheels are arranged at each end of the machine, which sprocket wheels are in line with upper and lower longitudinal guides on the framework. Upper and lower horizontally disposed rolls are carried by the hinges which are received in slots on the sprockets whereby the conveyer is driven, and which travel in the respective upper and lower guides of the framework. A large bearer or vertical roller is also carried by each clamp which travels between the upper and lower guides on the framework and between the upper and lower sprocket wheels at the end.

The book clamps have an opening and closing movement at an angle to the advancing movement of the conveyer. This movement may be either rectilinear or, as shown in the present instance, curvilinear. Means are provided for opening and closing these clamps to receive and discharge books during the travel of the conveyer. Preferably, as shown, the clamps are normally held closed, as by means of springs, and are opened to discharge and receive the books by suitable means, as cams.

The books may be discharged in any suitable manner. Preferably an inclined chute is employed which closes the cover on the book. This chute will preferably lead to a stacker, which stacks the books.

Other features of construction, combination of parts and arrangement of elements will appear as the specification proceeds.

In the accompanying drawings the invention is embodied in a concrete and several preferred forms, but changes of construction may of course be made without departing from the legitimate and intended scope of the invention.

In the said drawings.

Similar characters of reference indicate corresponding parts in the several views.

Figure 1:
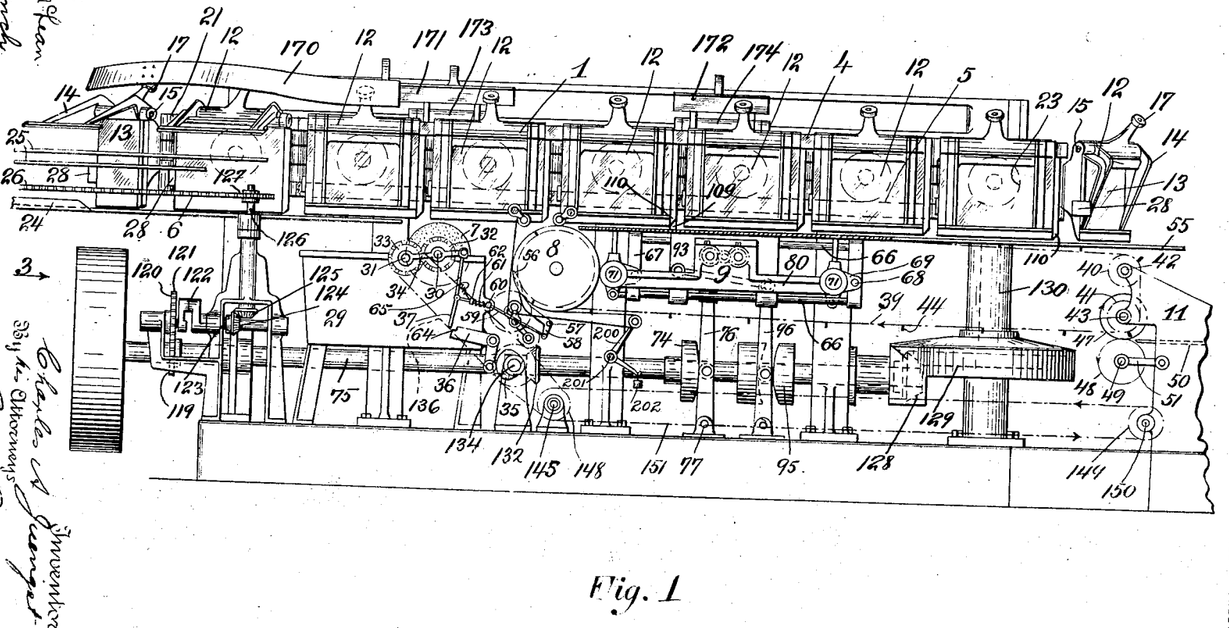
Figure 1 is a side elevation of a machine, embodying the invention, with some of the parts removed.
Figure 2:
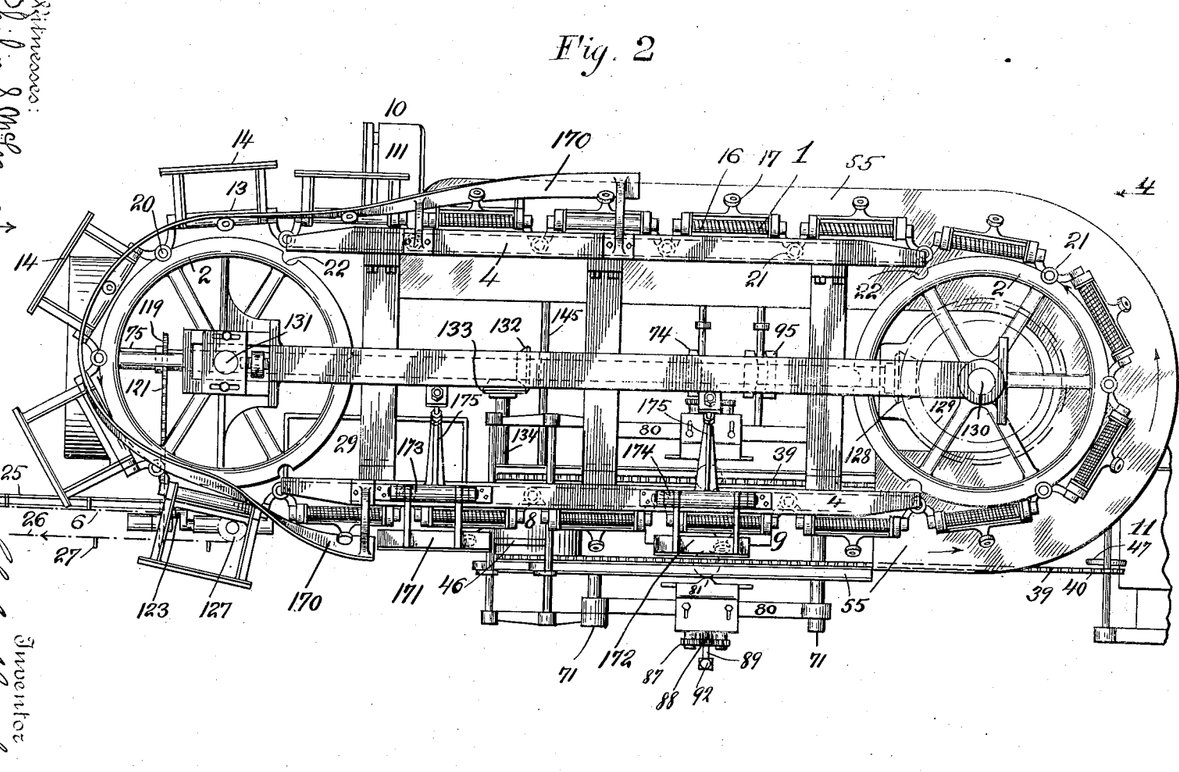
Fig. 2 is a general top plan view of Fig. 1.

In the drawings 1 indicates the book conveyer which passes around the upper and lower sprocket wheels 2 and 3 at each end and which slides in the guides 4 and 5. The means for feeding books to the conveyer are indicated by 6, while 7 denotes the glue roller, 8 a drum forming the cover presser, 9 the cover breaker, 10 is the delivery chute and 11 is the cover feed mechanism (see Figs. 1 and 2).

Figures 12, 13:
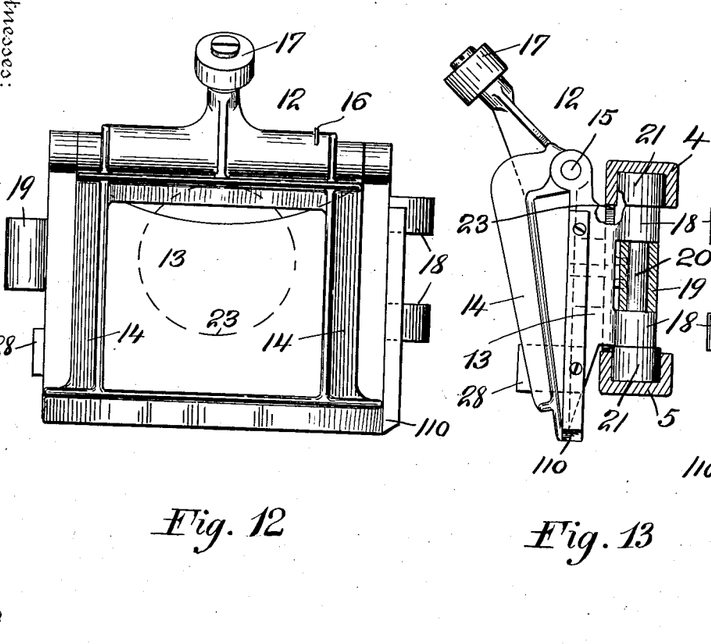
Fig. 12 is a front view of one of the book clamps.
Fig. 13 is a side view of the clamp shown in position on the guides of the framework, said guides being in section.
Figure 14:
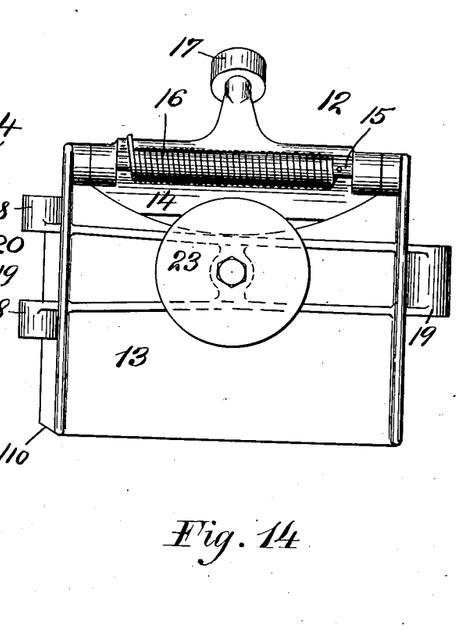
Fig. 14 is a rear view of the clamp.
Figure 15:
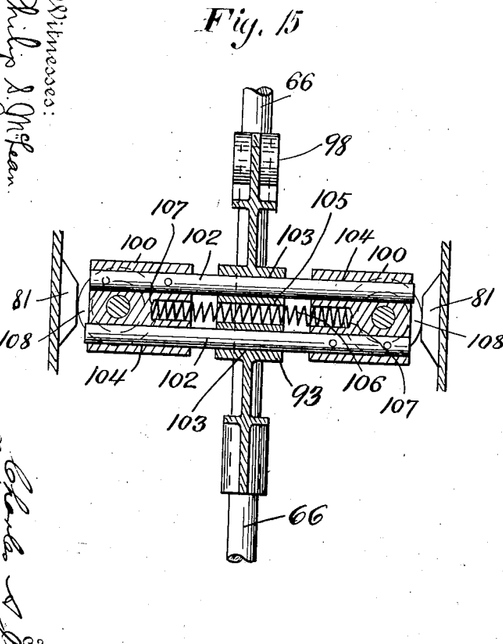
Fig. 15 is a transverse horizontal sectional view on the line 15—15 (Fig. 9).

Each book clamp 12 consists of a relatively stationary member 13 to which is pivoted the movable member 14 by means of the horizontal pivot 15. Normally the movable member 14 is held closed by means of the spring 16 which is attached at one end to the pivot 15 and at its other end to the movable member 14. 17 is a cam roller carried by the movable member 14 and which by engaging with a suitable cam opens the book clamp.

The book clamps are hinged together to form a conveyer, the member 13 being to that end provided wtih hinge members 18 and 19 connected together by means of the pins 20. These pins 20 carry horizontally disposed rollers 21 at their upper and lower ends which, it will be seen, rotate on a substantially vertical axis and travel between the flanges respectively of the upper and lower horizontally disposed guides 4 and 5 of the framework. These guides 4 and 5 terminate at the point where the sprocket wheels 2 and 3 are located and are arranged in the same horizontal plane as the latter so that these sprocket wheels virtually form continuations of the guides 4 and 5. The sprocket wheels 2 and 3 are provided with slots 22 into which the horizontal guide rolls 21 fit, and by these means the book conveyer is driven. The clamps further carry vertically disposed bearers or rolls 23 which rotate on a substantially horizontal axis and travel between the upper and lower guides 4 and 5 and between the upper and lower sprockets 2 and 3.

Figures 18, 19, 20, 21, 22, 23:
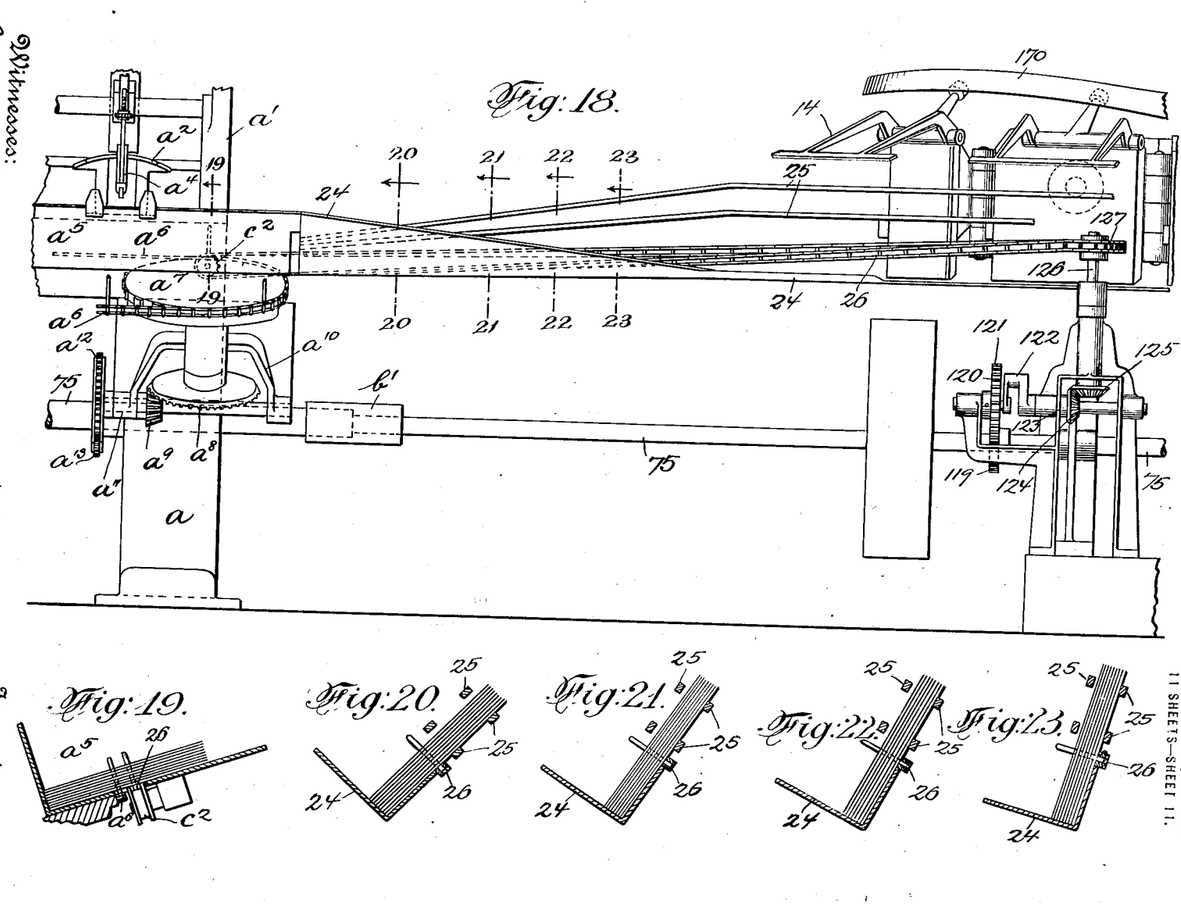
Fig. 18 is a view in elevation showing the transferring means for the signature groups from the signature gathering machine to the bookbinding machine.
Figs. 19 to 23 are transverse sectional views on the lines 19—19, 20—20, 21—21, 22—22 and 23—23 of Fig. 18.

Located adjacent to one end of the book covering machine is a signature gathering machine the framework of which is designated by the reference character $a$. $a'$ is a bracket mounted thereon and forming part of said machine; $a^2$ is a plate support for a group of signatures and $a^4$ is a swinging gripper arm of well-known construction adapted to engage the lowermost signature and remove the same and deliver it in the signature trough $a^5$ in which it and other signatures previously superimposed are moved along by the pins of the conveyer chain $a^6$ toward the right-hand end of the signature gathering machine. At this end of the signature gathering machine $a^7$ represents a sprocket or chain wheel around which the conveyer chain $a^6$ passes. This sprocket or chain wheel $a^7$ is mounted on a shaft which passes through a sleeve of the bracket support $a^{10}$, on the other end of which shaft is a bevel gear $a^8$ meshing with a bevel gear $a^9$ on a short shaft $a^{11}$ in bearings also formed as part of this bracket support $a^{10}$. At one end of the short shaft $a^{11}$ is a sprocket $a^{12}$ and there is a second sprocket $a^{13}$ in line with the sprocket $a^{12}$ on the power shaft 75, such sprockets being indicated by a chain, the power and rotation being communicated by the shaft 75 through the sprockets $a^{13}$ and $a^{12}$ and the intervening parts described to the sprocket or chain wheel $a^7$ for driving the conveyer chain $a^6$ and its pins. This power shaft 75 is provided with a coupling $b'$ receiving and secured to a smaller prolongation of said power shaft and also denoted by the reference character 75. The signature guiding trough 24 is at its left-hand end connected to and forms a prolongation of the signature trough $a^5$ and extends over to a point adjacent to the book covering machine. Moving along this trough 24 is a conveyer chain 26 having fingers 27 (Fig. 2) which at one end passes around the pulley or sprocket $c^2$ carried by the signature gathering machine, and at its other end around a sprocket 127 on the book covering machine, said sprocket 127 being secured to the upper end of a vertical shaft 126 suitably driven from the power shaft 75 by means hereinafter described. The movement of the conveyer chain 26 serves to progress the superimposed piles of signatures or sheets or the signature groups from the signature gathering machine to the book covering machine. Fig. 19 shows a section of the signature trough $a^5$ in which the signatures are placed flatwise in a slightly inclined and almost horizontal position, and the trough 24 continues this slight inclination, but, as illustrated in Figs. 20 to 23 inclusive, this trough 24 is so bent as it progresses in length that the piles of signatures or sheets are gradually turned from an inclined and almost horizontal position to an upright and almost vertical position. I provide in connection with the signature guiding trough 24, guide bars or racks 25 in pairs coming at opposite sides of the signatures and conforming to the curve of the trough 24 so that the signatures or sheets in their movement rest alike on said bars or racks and on the trough. The books are fed to the book covering machine in a horizontal direction, while standing in an upright position with their backs lowermost. As the books travel in the same general direction as the advancing movement of the book conveyer they will be brought into the open book clamp and when the fingers 27 have ceased to act on the books, the gage 28, carried by each clamp, will take hold of the book and properly register it with reference to the cover subsequently to be applied. The clamp then closes on the book, and the latter is then carried forward with the advancing movement of the book conveyer.

Figure 10:
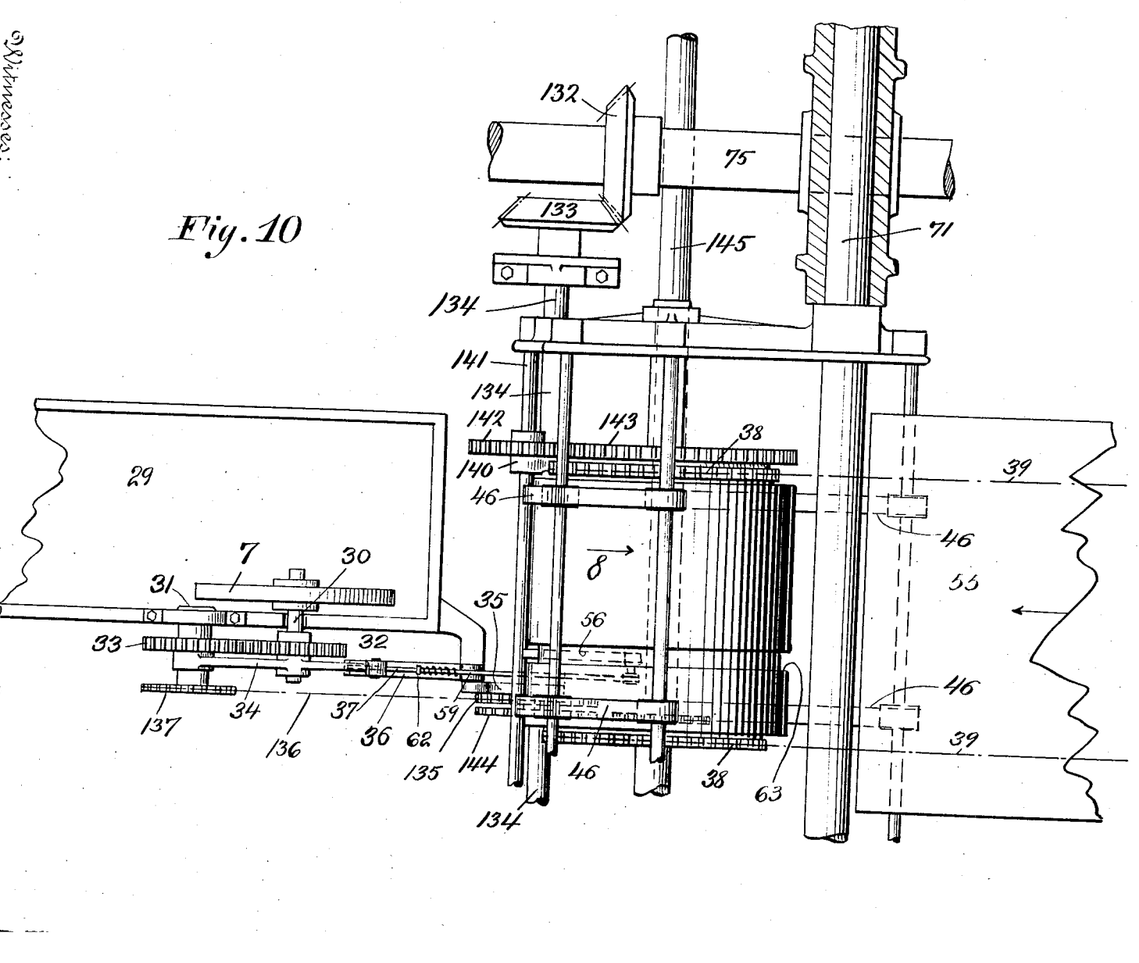
Fig. 10 is a top plan view of the cover feed drum, glue pot and roller, detector device and adjacent elements.

Located underneath the book conveyer is a glue pot 29 which feeds the glue roller 7. The latter is rotatably mounted on the stud 30 and receives its motion from the shaft 31 by means of the gears 32 and 33. The stud 30 is carried by the arm 34 secured to the shaft 31, and has imparted to it an up-and-down motion by means of the cam 35 which actuates the bell crank 36 controlling the connection 37 between the said bell crank 36 and arm 34. As the book passes over the glue roller, the latter is raised into contact with the back of the book and an adhesive is applied to the back of the said book.

The cover presser which is here shown as the cylinder or cover drum 8 is located in the rear of the adhesive applying means. As the book passes over the cover presser, the cover meets the book and is pressed firmly into contact with the back of the book, to which glue has already been applied. The drum thus forms a cover presser moving in a continuous path which by reason of its rounded contact surface applies the cover gradually and presses it in place progressively the full length of the book.

The cover conveyer is here constructed as follows: Carried on the same shaft as the cover drum 8 are two sprockets 38 of less pitch diameter than the pitch diameter of the cylinder 8. Passing over these sprockets are two endless chains 39. These chains are supported at their other end each by two sets of sprockets 40 and 41. The sprockets 40 and 41 are loosely mounted on the shafts 42 and 43, so that the chains 39 are driven from the shaft of the cylinder 8 and not from the shafts 42 and 43. The chains 39 are provided with pusher fingers 44 which serve to move the sheet or cover along the guides or sheet support 45 extending from the rollers 47 and 48 to the cylinder 8, until it reaches the cylinder 8. When the sheet reaches this cylinder the fingers 44 run down below the pitch circumference of the cylinder 8 and the tapes 46 serve to convey the cover around the cylinder to the top thereof. As the surface speed of the cylinder 8 is greater than the speed of the chains 39, the speed of the cover will be accelerated and it will leave the pusher fingers 44. 200 indicates a belt tightener consisting of a plurality of bell cranks mounted on the pivot 201 and provided with the weights 202. By this means the tension of the tapes 46 is regulated.

The cover may be fed to the chains 39 in any suitable manner. For instance an automatic sheet feeding device of any type may be employed. In the present instance there are utilized two pairs of drop rollers 47 and 48 which are mounted fast on the shafts 43 and 49. These drop rollers rotate at a higher speed than the chains 39 so that when a sheet or cover from the feed board 50 is placed in the bite of these drop rollers, it is fed to the chains 39 with a quick motion. The shaft 49 is hung on two arms 51 which are moved up and down, to nip the sheet, by means of the cam 52, spring 207 and connecting rod 53. The pusher fingers 44 in addition to moving the sheet also serve as gages to register the sheet or cover to coincide with the books carried by the clamps, and which books are registered by means of the gages 28. Preferably the number of book clamps and the number of divisions or pusher fingers on the chains 39 is equal. In the present instance there are eighteen book clamps and a similar number of pusher fingers 44. In order to prevent sagging of the chains 39, the pusher fingers 44 may travel on longitudinal guides 54 supported on the frame. The chains 39 encircle the cover breaker 9, and run at the top below the upper sheet support 55 which latter has a slot in it coextensive with the cover breaker. Otherwise this upper sheet support is unbroken and extends as a shelf around the machine below the book conveyer, from the point where the cover breaker is located to the point where the delivery chute 10 is located.

In order to prevent the glue roller 7 from applying paste to the book when there is no cover to meet a certain book, means are provided for tripping the glue roller. 56 indicates a spring feeler pivoted at 57. This feeler is connected by means of the link 58 to the rod 59 which passes through the stud 60 and is attached to the connection 37. A spring 61 is located between the stud 60 and the collar 62, and normally tends to push the spring feeler 56 into the groove 63 of the cover drum 8, and the connection 37 off the heel 64 of the bell crank 36. The spring 65 tends to counteract the spring 61 and assists in restoring the connection 37 to its seat on the heel 64. When no cover is on the drum 8, the feeler 56 is forced into the groove 63 and the connection 37 is forced off the heel 64. The connection between the arm 34 and the actuating cam 35 is therefore broken and the glue roller is not raised. When, however, the cover comes along on the drum 8, the feeler 56 is forced outward thereby restoring the connection 37 to its seat on the heel 64, so that as the cam 35 rotates, the glue roller 7 will be raised. The spring 65 being opposed to the spring 61 assists the cover in displacing the feeler finger out of the groove in the cylinder and being attached directly to the connection 37, assists in replacing said connection in engagement with the heel 64.

Figure 7:
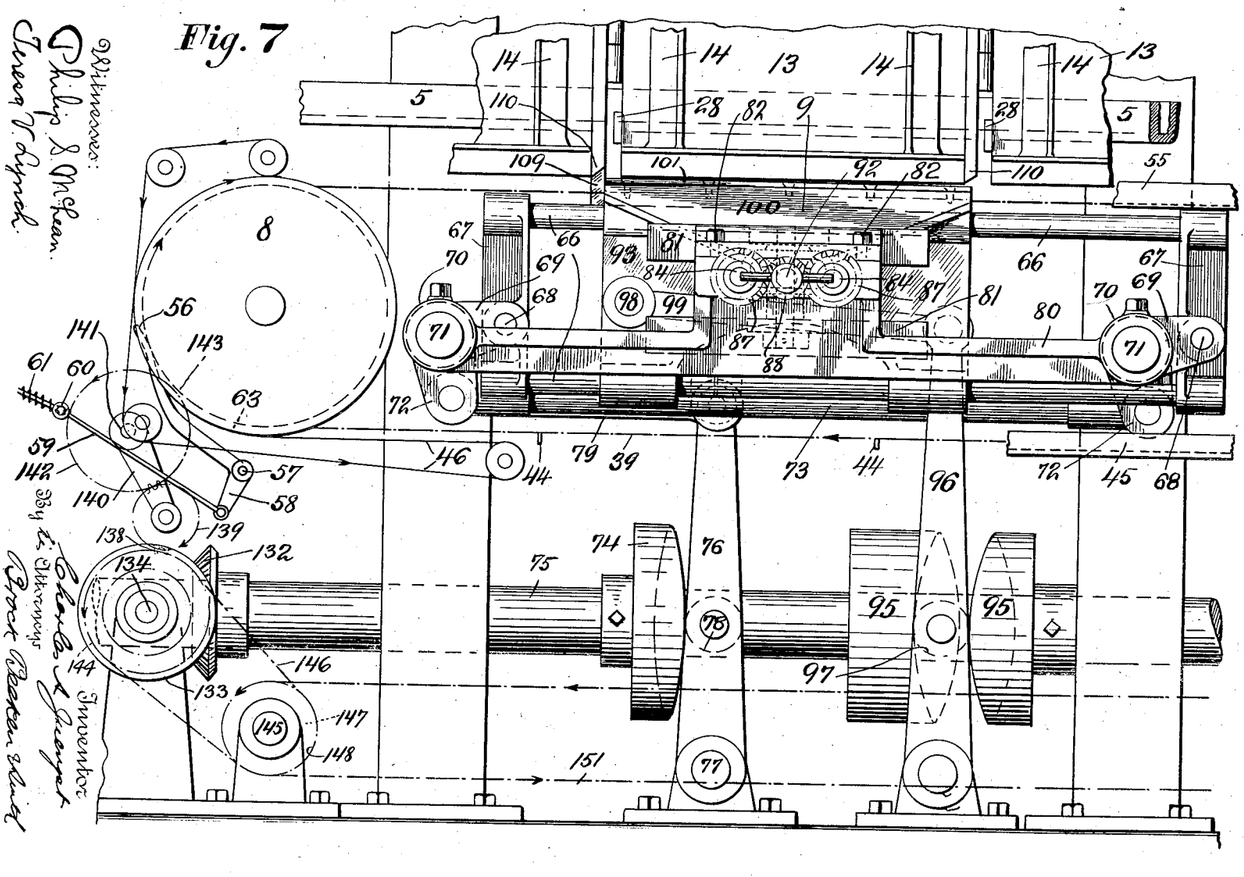
Fig. 7 is a side elevation of the cover breaker and adjacent parts.

The cover breaker is movable horizontally on a vertically adjustable guide which guide comprises two horizontal shafts 66 connected together by means of the vertical bars 67. This guide is mounted on the transverse studs 68 swung on the arms 69 of the bushing 70 on the transverse fixed supporting shafts 71. 72 indicate depending arms from the bushing 70 connected together by means of the rod 73. 74 is a cam mounted on the main shaft 75. The motion of this cam is transmitted by means of a lever 76 pivoted at 77 and having a cam roll 78. This lever 76 is connected to one of the depending arms 72 by means of the connection 79. Under the influence of the cam 74, the guide is raised and lowered by turning the bushings 70 around the two supporting shafts 71.

Figure 8:
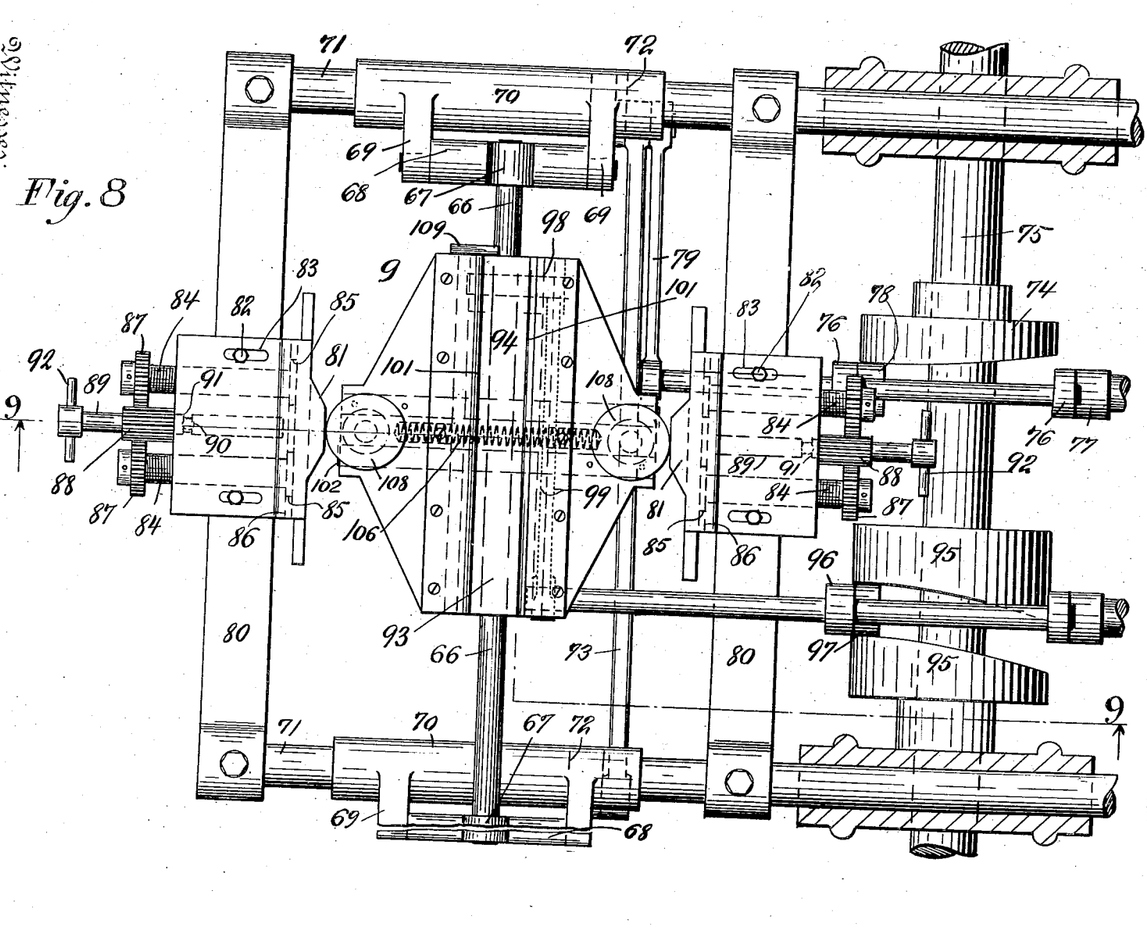
Fig. 8 is a plan view partly in section of the cover breaker shown in Fig. 7.

Extending between the supporting shafts 71 are the brace rods 80 which carry the breaker cams 81 on opposite sides of the guide. These breaker cams are mounted, and adjustable in a transverse direction, on the brace rods 80 and are held in position by means of the set screws 82 passing through the slots 83. Two adjusting screws 84 extend through the brace rods and are provided at their inner ends with a head 85 fitting in a recess 86 of the breaker cams. The screws 84 have pinions 87 on their outer ends which mesh with a central and long gear 88 mounted on a pintle 89 which turns idly in the brace rods 80 and is held in position by a set screw 90 extending into the circumferential slot 91. When the set screws 82 are loosened, the breaker cams can be adjusted by turning the handle 92 on the gear 88.

Figure 9:
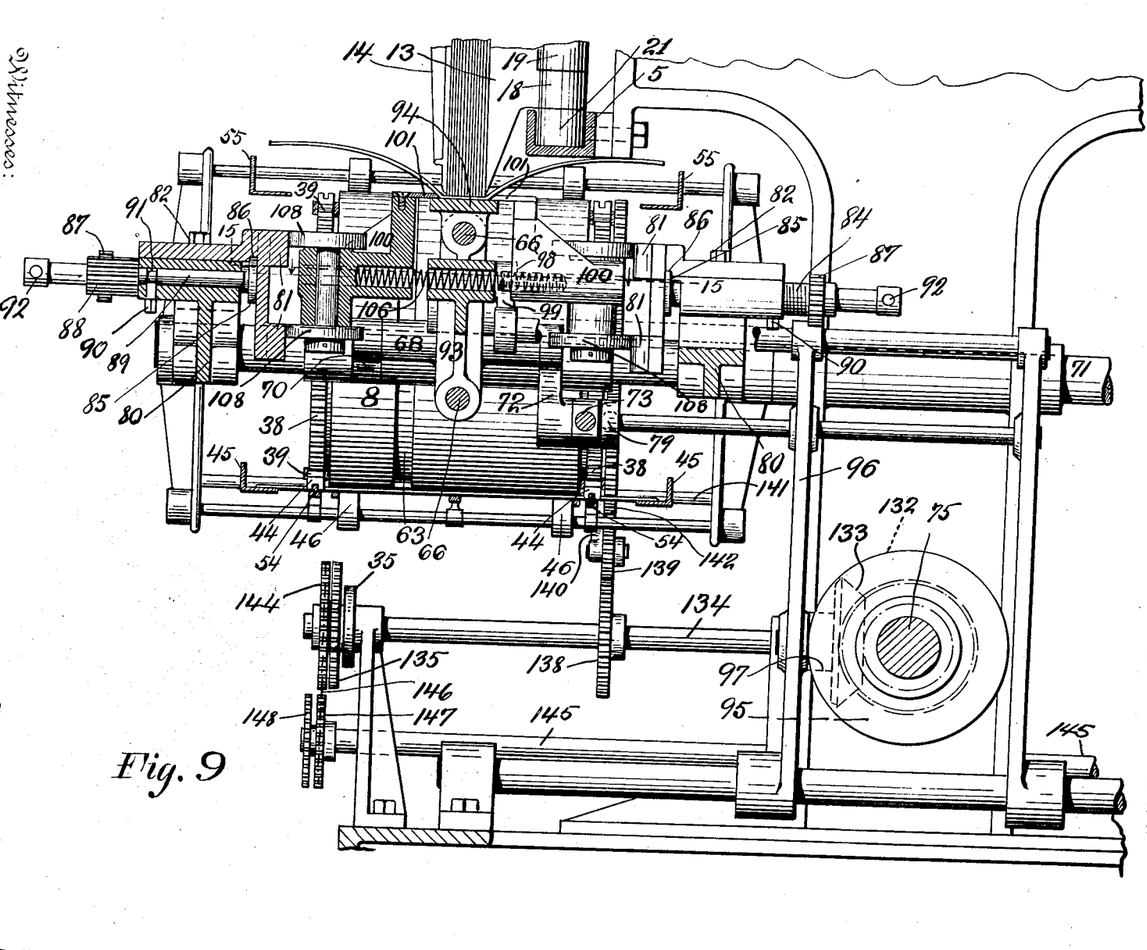
Fig. 9 is a vertical transverse sectional view on the irregular line 9—9 (Fig. 8).

Mounted on the shafts 66 of the guide is a slide 93 provided with a central book support 94. This slide is caused to reciprocate by the cam 95, acting through the lever 96, having the cam roll 97, and connected to the pivot 98 of the slide by means of the rod 99. Mounted longitudinally on the brackets 100 opposite to each other are the cover breaker jaws 101. Secured to each bracket 100 is a guide rod 102 which slides through holes 103 in the slide 93 and in a corresponding hole 104 in the opposite bracket 100. Passing through a hole 105 in the slide 93 is a spring 106 which engages in the sockets 107 of the cover breaker jaws 101 and normally presses them apart. Carried by the brackets 100 are rollers 108 which engage with the cams 81 as the slide 93 reciprocates and counteract the effect of the spring 106 thereby moving the cover breaker jaws 101 inwardly to break the cover.

As the book comes opposite the cover breaker, the guide comprising the two shafts 66 and the elements carried thereby rises by reason of the bushings 70 being turned around the supporting shafts 71 under the influence of the cam 74. This brings the central book support 94 into contact with the book. Substantially at this moment the slide 93 commences its forward movement under the influence of the cam 95. As the slide advances, the rollers 108 come in contact with the cams 81 and the brackets 100, carrying the cover breaker jaws 101, are moved inwardly into contact with the cover.

When the rollers 108 have passed the cams 81 the cover breaker jaws recede. After that the guide comprising shafts 66 and elements carried thereby drops down, and the slide 93 returns to its original position.

In order to prevent displacement of the slide with reference to the book clamp as they travel in unison, there is provided a stop 109 on the slide 93 which comes in contact with the stop 110 on the book clamp. These two stops virtually secure the two members together while they travel in unison.

The book continues its onward travel until it reaches the delivery chute 10. Here the book clamp opens and the book travels down the chute, whereby the cover flaps are closed up around the book.

Figure 11:
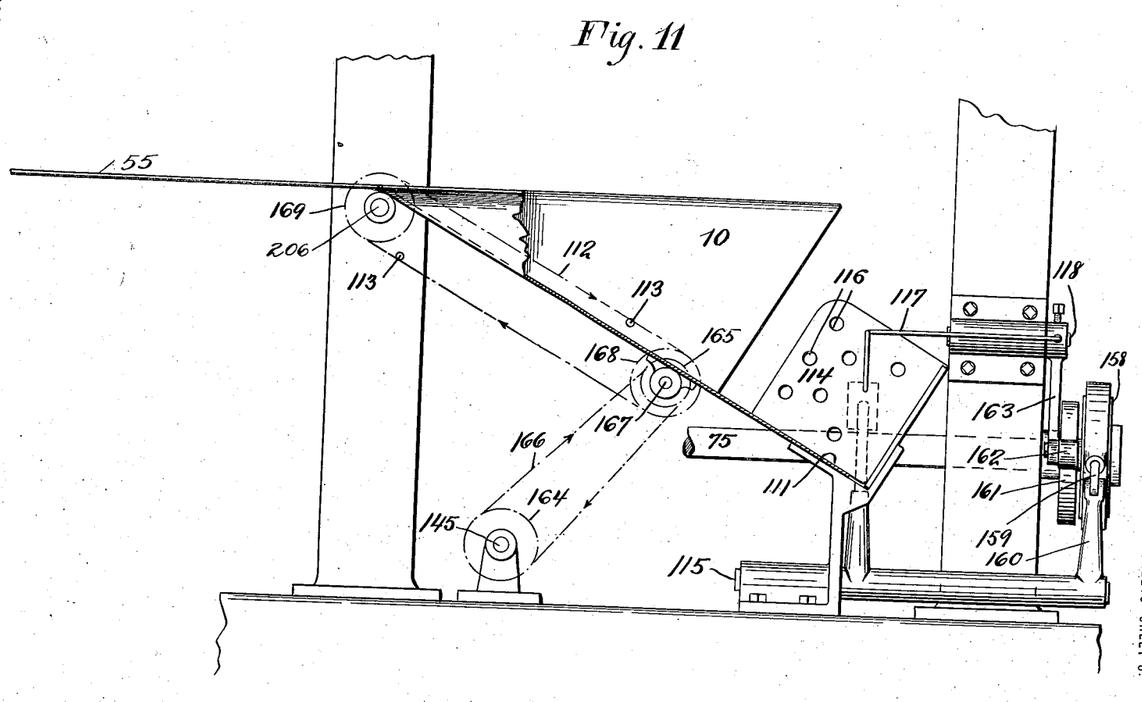
Fig. 11 is a side elevation of the delivery chute and stacker.

The chute 10 is inclined as shown, and leads down to the trough 111 of the stacker. Located in the chute 10 is an endless conveyer 112 provided with laterally projecting pins 113 which engage with the books and feed them downward. 203 is a supporting shaft carried by the framework and provided with a bracket 204 which forms a support for the shelf 55 adjacent to the chute 10. This shaft also carries a bearing 205 for the shaft 206 of the chute delivery mechanism.

The stacker consists of the trough 111 and a vibrating stacker blade 114 mounted on the shaft 115. This stacker blade gradually moves the books out through the trough 111. In order to prevent the blade from adhering to the books on account of air pressure, perforations 116 are provided. To hold the books already stacked and to prevent them from becoming displaced there is provided a separator 117, mounted on the shaft 118, which moves down and holds the books while the stacker blade recedes.

Motion may be imparted to the various devices, comprising the machine, in many ways. In the form here shown there is a main shaft 75 extending longitudinally underneath the machine. At the forward end of this shaft is a sprocket wheel 119 which drives the sprocket wheel 120 by means of the chain 121. The sprocket 120 has a crank connection 122 with the shaft 123 carrying the bevel gear 124 meshing with the bevel gear 125 on the upright shaft 126. The shaft 126 carries a sprocket 127 which drives the chain 26 of the book feeding device (see Figs. 1 and 3).

At the other end of the main shaft 75 is a bevel pinion 128 meshing with the bevel gear 129 on the upright shaft 130, which latter carries the sprockets 2 and 3 of the book conveyer. The sprockets 2 and 3 of the book conveyer at the forward end of the machine are mounted on a rotatable shaft 131 having no driving connection with the main shaft except through the book conveyer, and these forward sprockets are therefore merely idlers (see Figs. 1 and 2).

Mounted substantially midway of the main shaft is a bevel gear 132 which engages with a bevel-gear 133 on the transverse shaft 134 having the sprocket 135. A chain 136 passes from this sprocket 135 up to the sprocket 137 on the shaft 31, thereby driving the glue roller (see Figs. 1, 7, 9 and 10).

Mounted on the shaft 134 is further a pinion 139 swung gear 138 meshing with the pinion 139 swung on the arm 140 of the shaft 141. The pinion 139 meshes with the gear 142 on the shaft 141, which gear 142 meshes with the gear 143 of the cover drum. By these means motion is imparted to the cover drum and to the conveyer 39 (see Figs. 7, 9 and 10).

Mounted on the shaft 134 is another sprocket 144 which imparts motion to the shaft 145 by means of the chain 146 and sprocket 147. On the shaft 145 is another sprocket 148 which imparts motion to the sprocket 149 on the shaft 150 by means of the chain 151. The shaft 150 has a gear 152 meshing with a gear 153 which latter meshes with the pinion 154, on the shaft 49, and with the gear 155. Gear 155 in turn meshes with the pinion 156, on the shaft 43, and with the gear 157 on the shaft 42 (see Figs. 1, 2, 4, 5, 7, 9 and 10).

Figures 3, 4, 5, 6:
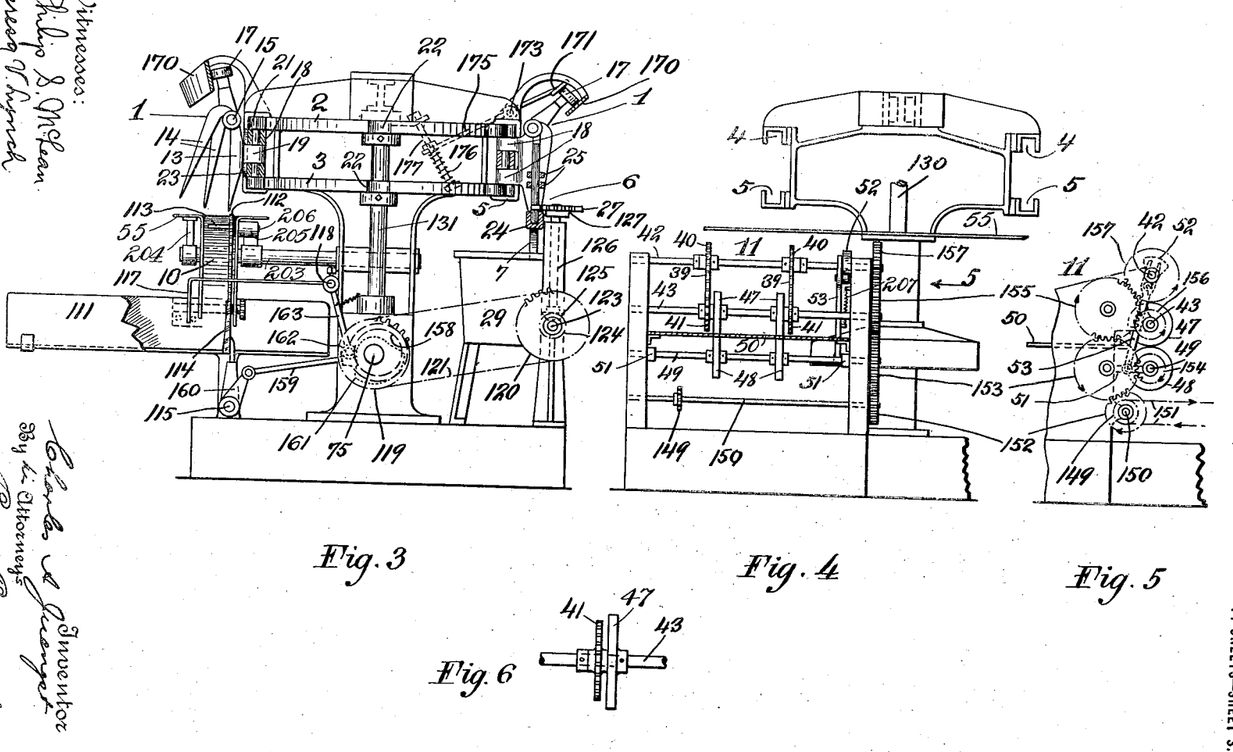
Fig. 3 is an end view looking in the direction of the arrow 3 (Fig. 2) with the book conveyer and operating cam for the book clamps in section.
Fig. 4 is an end view of the framework of the machine looking in the direction of the arrow 4 (Fig. 2), showing also the cover feeding mechanism.
Fig. 5 is a side elevation of the gearing of the cover feeding mechanism looking in the direction of the arrow 5 (Fig. 4).
Fig. 6 is a detail view of one of the drop rollers showing how it is mounted.

Mounted on the main shaft 75 is further an eccentric 158 connected by means of the rod 159 to the rock arm 160, on the rock shaft 115 which thus serves to vibrate the stacker blade 114 (see Figs. 3 and 11).

Adjacent to the eccentric 158 is a cam 161 with which engages the cam roll 162 of the arm 163. This arm 163 is mounted on the stud 118 and is connected to the separator 117 (see Figs. 3 and 11).

The shaft 145 extends across the machine and carries a sprocket 164 which communicates motion to the sprocket 165 by means of the chain 166. The sprocket 165 is mounted on the stud 167 which also carries another sprocket 168 over which the chain 112 passes. This chain 112 passes over the sprocket 169 on the shaft 206 at its other end (see Fig. 11).

170 indicates a cam bolted to the framework which opens the book clamps. This cam starts at a point just before the book clamps reach the chute 10. The shape of the cam is such that it acts on the roller 17 to open the book clamp just as the said clamp reaches the delivery chute 10. The clamp is opened gradually and continues in its open position until it almost reaches the point where the books are fed in when by reason of the shape of the cam 170 it is opened still farther and then closes quickly by reason of the abrupt change in the shape of the cam.

Above the glue roller and above the cover breaker are two cams 171 and 172 which are pivoted at 173 and 174. Both of these cams are constructed alike and both act to assist the springs 16 in keeping the book clamps closed while the glue roller and cover breaker act upon the book. In fact, they prevent the clamps from opening and the springs 16 from yielding. Each cam 171 and 172 is provided with an arm 175 which is held under tension by the spring 176 surrounding the rod 177.

Figure 16:
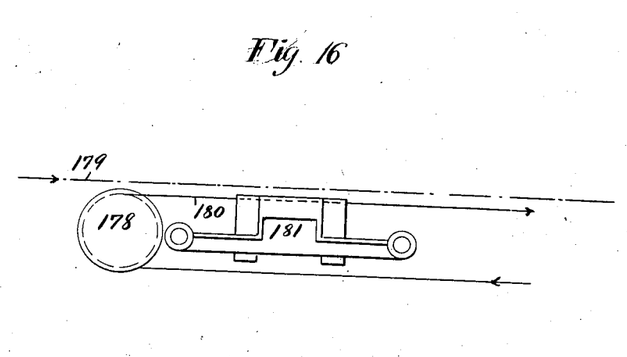
Figs. 16 and 17 are diagrammatic side elevations showing modifications of the cover presser and breaker.
Figure 17:
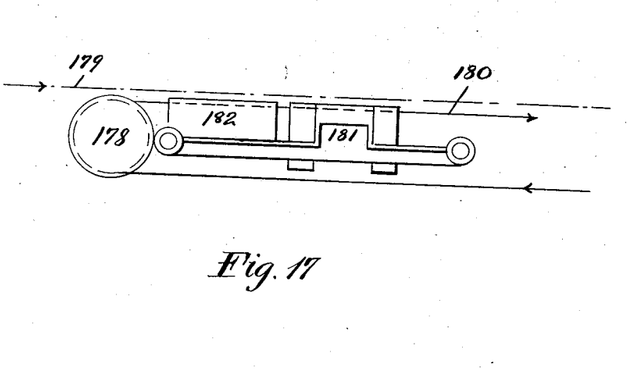

In Figs. 16 and 17 are illustrated certain modifications of the cover breaker and presser. In these figures the cover drum 178 is shown located beneath the path 179 of the back of the book. The cover in this instance is not applied to the back of the book by the cover drum, but is carried forward by the conveyer 180.

In Fig. 16, the member 181 indicates a cover breaker such as is shown in Figs. 7, 8 and 9. This cover breaker would, in this instance, therefore also act as a cover presser and would lift the cover off the conveyer 180 into contact with the book.

In Fig. 17, 181 indicates the same cover breaker as shown in Fig. 16, but in addition thereto there is a cover presser 182. This cover presser member 182 raises the cover off the conveyer and presses it into contact with the book, while the member 181 breaks the cover as usual.

What is claimed, is:

Book covering mechanism comprising: a signature gathering mechanism delivering signature groups successively, a book covering machine including a plurality of clamps traveling continuously in one direction for receiving and clamping successive signature groups while on the run, means intermediate said signature gathering mechanism and said clamps for transferring each signature group from the gathering mechanism to a successive clamp while on the run, means for registering the signature groups in the clamps, and means for automatically closing said clamps successively on said signature groups while on the run.

Signed at New York in the county of New York and State of New York this 17th day of March A. D. 1910.

CHARLES A. JUENGST.

Witnesses:
MABLE SHAW,
PHILIP S. MCLEAN.